US012499341B2

(12) United States Patent
Schoening

(10) Patent No.: US 12,499,341 B2
(45) Date of Patent: Dec. 16, 2025

(54) COMPACT RUGGED RFID ELECTRONICS SYSTEM

(71) Applicant: A-1 PACKAGING SOLUTIONS, INC., St. Charles, IL (US)

(72) Inventor: Kenneth F. Schoening, St. Charles, IL (US)

(73) Assignee: A-1 PACKAGING SOLUTIONS, INC., St. Charles, IL (US)

(*) Notice: Subject to any disclaimer, the term of this patent is extended or adjusted under 35 U.S.C. 154(b) by 29 days.

(21) Appl. No.: 18/093,711

(22) Filed: Jan. 5, 2023

(65) Prior Publication Data

US 2023/0214621 A1 Jul. 6, 2023

Related U.S. Application Data

(60) Provisional application No. 63/266,507, filed on Jan. 6, 2022.

(51) Int. Cl.
*G06K 17/00* (2006.01)
*G06K 19/077* (2006.01)
*G06Q 10/087* (2023.01)

(52) U.S. Cl.
CPC ... *G06K 17/0022* (2013.01); *G06K 19/07758* (2013.01); *G06Q 10/087* (2013.01)

(58) Field of Classification Search
CPC ........... G06K 17/022; G06K 19/07758; G06Q 10/087
USPC ........................................................ 340/572.1
See application file for complete search history.

(56) References Cited

U.S. PATENT DOCUMENTS

| | | | |
|---|---|---|---|
| 5,832,814 | A | 11/1998 | Nakatani |
| 6,600,418 | B2 | 7/2003 | Francis et al. |
| 6,661,278 | B1 | 12/2003 | Gilliland |
| 6,664,909 | B1 | 12/2003 | Hyde et al. |
| 6,842,327 | B1 | 1/2005 | Diorio et al. |
| 6,853,583 | B2 | 2/2005 | Diorio et al. |
| 6,873,281 | B1 | 3/2005 | Esterberg et al. |

(Continued)

FOREIGN PATENT DOCUMENTS

| | | | |
|---|---|---|---|
| CN | 117572233 A * | 2/2024 | |
| WO | WO-2016172236 A1 * | 10/2016 | ......... G06K 7/10009 |

OTHER PUBLICATIONS

International Search Report issued in PCT Application No. PCT/US2023/010205 dated May 8, 2023.

(Continued)

*Primary Examiner* — Kam Wan Ma
(74) *Attorney, Agent, or Firm* — MARSHALL, GERSTEIN & BORUN LLP

(57) ABSTRACT

A compact RFID electronics container of an inventory tracking and management system includes a housing with an interior volume and one or more walls at least partially defining the interior volume. A transmitter and a voltage converter are disposed in the interior volume of the housing. The voltage converter is electrically coupled to the transmitter. A first connection port is disposed through the one or more walls of the housing and is arranged to connect the transmitter with a sensor externally disposed relative to the housing. A second connection port is disposed through the one or more walls of the housing and is arranged to connect the voltage converter with a power source externally disposed relative to the housing.

52 Claims, 5 Drawing Sheets

(56) References Cited

U.S. PATENT DOCUMENTS

| | | | |
|---|---|---|---|
| 6,909,389 | B1 | 6/2005 | Hyde et al. |
| 6,943,678 | B2 | 9/2005 | Muirhead |
| 6,950,342 | B2 | 9/2005 | Lindhorst et al. |
| 6,954,159 | B1 | 10/2005 | Cooper et al. |
| 6,958,646 | B1 | 10/2005 | Colleran et al. |
| 6,965,142 | B2 | 11/2005 | Diorio et al. |
| 6,977,527 | B1 | 12/2005 | Hyde |
| 7,026,935 | B2 | 4/2006 | Diorio et al. |
| 7,030,786 | B2 | 4/2006 | Kaplan et al. |
| 7,038,544 | B2 | 5/2006 | Diorio et al. |
| 7,038,603 | B2 | 5/2006 | Diorio et al. |
| 7,042,701 | B2 | 5/2006 | Diorio et al. |
| 7,049,872 | B2 | 5/2006 | Diorio et al. |
| 7,049,964 | B2 | 5/2006 | Hyde et al. |
| 7,061,324 | B2 | 6/2006 | Diorio et al. |
| 7,071,507 | B2 | 7/2006 | Diorio et al. |
| 7,102,438 | B1 | 9/2006 | Colleran et al. |
| 7,107,022 | B1 | 9/2006 | Thomas et al. |
| 7,116,240 | B2 | 10/2006 | Hyde |
| 7,120,550 | B2 | 10/2006 | Diorio et al. |
| 7,123,171 | B2 | 10/2006 | Kaplan et al. |
| 7,145,203 | B2 | 12/2006 | Wang |
| 7,145,370 | B2 | 12/2006 | Bernard et al. |
| 7,149,118 | B2 | 12/2006 | Diorio et al. |
| 7,177,182 | B2 | 2/2007 | Diorio et al. |
| 7,183,926 | B2 | 2/2007 | Diorio et al. |
| 7,187,237 | B1 | 3/2007 | Diorio et al. |
| 7,187,290 | B2 | 3/2007 | Hyde et al. |
| 7,199,663 | B2 | 4/2007 | Diorio et al. |
| 7,212,446 | B2 | 5/2007 | Diorio et al. |
| 7,215,251 | B2 | 5/2007 | Hyde |
| 7,221,596 | B2 | 5/2007 | Pesavento et al. |
| D543,976 | S | 6/2007 | Oliver |
| 7,233,274 | B1 | 6/2007 | Kuhn |
| D546,819 | S | 7/2007 | Oliver |
| D546,820 | S | 7/2007 | Oliver |
| D546,821 | S | 7/2007 | Oliver |
| D546,822 | S | 7/2007 | Oliver |
| D547,306 | S | 7/2007 | Oliver |
| D547,754 | S | 7/2007 | Oliver |
| 7,242,614 | B2 | 7/2007 | Diorio et al. |
| 7,245,213 | B1 | 7/2007 | Esterberg et al. |
| 7,246,751 | B2 | 7/2007 | Diorio et al. |
| D548,225 | S | 8/2007 | Oliver |
| 7,253,719 | B2 | 8/2007 | Diorio et al. |
| 7,257,033 | B2 | 8/2007 | Wang et al. |
| 7,262,092 | B2 | 8/2007 | Diorio et al. |
| 7,263,001 | B2 | 8/2007 | Wang et al. |
| 7,283,037 | B2 | 10/2007 | Diorio et al. |
| 7,283,390 | B2 | 10/2007 | Pesavento |
| 7,289,358 | B2 | 10/2007 | Pesavento et al. |
| 7,304,579 | B2 | 12/2007 | Diorio et al. |
| 7,307,528 | B2 | 12/2007 | Glidden et al. |
| 7,307,534 | B2 | 12/2007 | Pesavento |
| 7,312,622 | B2 | 12/2007 | Hyde et al. |
| 7,315,067 | B2 | 1/2008 | Wang |
| 7,315,248 | B2 | 1/2008 | Egbert |
| D562,810 | S | 2/2008 | Oliver |
| D563,397 | S | 3/2008 | Oliver |
| 7,375,398 | B2 | 5/2008 | Wang et al. |
| 7,380,190 | B2 | 5/2008 | Hara et al. |
| D570,337 | S | 6/2008 | Oliver |
| 7,382,257 | B2 | 6/2008 | Thomas et al. |
| 7,388,420 | B2 | 6/2008 | Diorio et al. |
| 7,388,468 | B2 | 6/2008 | Diorio et al. |
| 7,389,101 | B2 | 6/2008 | Diorio et al. |
| 7,391,329 | B2 | 6/2008 | Humes et al. |
| 7,394,324 | B2 | 7/2008 | Diorio et al. |
| 7,400,255 | B2 | 7/2008 | Horch |
| 7,403,122 | B1 | 7/2008 | Koepp et al. |
| 7,405,659 | B1 | 7/2008 | Hyde |
| 7,405,660 | B2 | 7/2008 | Diorio et al. |
| D574,369 | S | 8/2008 | Oliver |
| D574,370 | S | 8/2008 | Oliver |
| 7,408,466 | B2 | 8/2008 | Diorio et al. |
| 7,408,809 | B2 | 8/2008 | Diorio et al. |
| 7,417,548 | B2 | 8/2008 | Kavounas et al. |
| 7,419,096 | B2 | 9/2008 | Esterberg et al. |
| 7,420,469 | B1 | 9/2008 | Oliver |
| 7,423,539 | B2 | 9/2008 | Hyde et al. |
| D578,114 | S | 10/2008 | Oliver |
| 7,432,814 | B2 | 10/2008 | Dietrich et al. |
| 7,436,308 | B2 | 10/2008 | Sundstrom et al. |
| 7,448,547 | B2 | 11/2008 | Esterberg |
| 7,472,835 | B2 | 1/2009 | Diorio et al. |
| 7,482,251 | B1 | 1/2009 | Paulsen et al. |
| D586,336 | S | 2/2009 | Oliver |
| D587,691 | S | 3/2009 | Oliver |
| 7,525,438 | B2 | 4/2009 | Hyde et al. |
| D592,192 | S | 5/2009 | Oliver |
| 7,528,724 | B2 | 5/2009 | Horch |
| 7,528,728 | B2 | 5/2009 | Oliver et al. |
| 7,541,843 | B1 | 6/2009 | Hyde et al. |
| 7,557,714 | B2 | 7/2009 | Roeder et al. |
| 7,561,866 | B2 | 7/2009 | Oliver et al. |
| 7,592,897 | B2 | 9/2009 | Diorio et al. |
| 7,616,120 | B1 | 11/2009 | Humes et al. |
| D605,641 | S | 12/2009 | Oliver |
| D606,056 | S | 12/2009 | Oliver |
| D606,057 | S | 12/2009 | Oliver |
| 7,633,376 | B2 | 12/2009 | Diorio et al. |
| 7,633,377 | B2 | 12/2009 | Sadr |
| 7,651,882 | B1 | 1/2010 | Bockorick et al. |
| D610,576 | S | 2/2010 | Oliver |
| 7,667,231 | B2 | 2/2010 | Hyde et al. |
| 7,667,575 | B2 | 2/2010 | Husak et al. |
| 7,667,589 | B2 | 2/2010 | Desmons et al. |
| 7,667,652 | B2 | 2/2010 | Gevargiz et al. |
| D611,037 | S | 3/2010 | Oliver |
| D613,276 | S | 4/2010 | Oliver |
| 7,696,882 | B1 | 4/2010 | Rahimi et al. |
| D617,320 | S | 6/2010 | Oliver |
| 7,733,227 | B1 | 6/2010 | Pesavento et al. |
| D620,484 | S | 7/2010 | Oliver |
| D620,928 | S | 8/2010 | Oliver |
| 7,768,248 | B1 | 8/2010 | Hyde |
| 7,768,406 | B1 | 8/2010 | Peach et al. |
| 7,804,400 | B2 | 9/2010 | Muirhead |
| 7,808,387 | B1 | 10/2010 | Kuhn |
| 7,830,262 | B1 | 11/2010 | Diorio et al. |
| 7,830,322 | B1 | 11/2010 | Oliver et al. |
| 7,872,582 | B1 | 1/2011 | Diorio |
| 7,873,326 | B2 | 1/2011 | Sadr |
| 7,907,899 | B1 | 3/2011 | Oliver |
| 7,917,088 | B2 | 3/2011 | Hyde et al. |
| 7,920,046 | B1 | 4/2011 | Aiouaz et al. |
| 7,969,236 | B1 | 6/2011 | Hyde et al. |
| 7,970,484 | B2 | 6/2011 | Fontanot |
| 7,973,643 | B2 | 7/2011 | Hyde et al. |
| 7,973,645 | B1 | 7/2011 | Moretti et al. |
| 7,978,005 | B1 | 7/2011 | Hyde et al. |
| 7,982,611 | B1 | 7/2011 | Picasso et al. |
| 7,990,249 | B1 | 8/2011 | Hyde et al. |
| 7,999,675 | B2 | 8/2011 | Diorio et al. |
| 8,044,774 | B1 | 10/2011 | Diorio |
| 8,044,801 | B1 | 10/2011 | Hyde et al. |
| 8,063,740 | B1 | 11/2011 | Diorio et al. |
| 8,072,311 | B2 | 12/2011 | Sadr et al. |
| 8,072,327 | B2 | 12/2011 | Enyedy et al. |
| 8,072,329 | B1 | 12/2011 | Srinivas et al. |
| 8,077,013 | B2 | 12/2011 | Cooper |
| 8,082,556 | B1 | 12/2011 | Aiouaz et al. |
| 8,115,590 | B1 | 2/2012 | Diorio et al. |
| 8,115,597 | B1 | 2/2012 | Oliver et al. |
| 8,115,632 | B1 | 2/2012 | Rahimi et al. |
| 8,120,488 | B2 | 2/2012 | Bloy |
| 8,120,494 | B1 | 2/2012 | Aiouaz et al. |
| 8,134,451 | B1 | 3/2012 | Diorio |
| 8,154,385 | B2 | 4/2012 | Aiouaz et al. |
| 8,159,367 | B2 | 4/2012 | Hofer et al. |
| 8,174,367 | B1 | 5/2012 | Diorio |
| 8,174,369 | B2 | 5/2012 | Jones et al. |
| 8,188,927 | B1 | 5/2012 | Koepp et al. |
| 8,193,912 | B1 | 6/2012 | Gutnik et al. |

(56) References Cited

U.S. PATENT DOCUMENTS 8,201,748 B2 6/2012 Koepp et al.
8,224,610 B2 7/2012 Diorio et al.
8,228,175 B1 7/2012 Diorio et al.
8,237,562 B1 8/2012 Picasso et al.
8,244,201 B2 8/2012 Oliver et al.
8,258,918 B1 9/2012 Diorio et al.
8,258,955 B1 9/2012 Hyde et al.
8,260,241 B1 9/2012 Hyde
8,279,045 B2 10/2012 Diorio et al.
8,286,887 B2 10/2012 Wilkinson
8,294,582 B1 10/2012 Humes et al.
8,313,594 B2 11/2012 Muirhead
8,325,014 B1 12/2012 Sundstrom et al.
8,325,042 B1 12/2012 Hyde et al.
8,326,256 B1 12/2012 Kuhn
8,332,656 B2 12/2012 Jones et al.
8,344,823 B2 1/2013 Bloy et al.
8,344,857 B1 1/2013 Oliver et al.
8,344,858 B2 1/2013 Bloy
8,350,665 B1 1/2013 Sundstrom et al.
8,354,917 B2 1/2013 Diorio et al.
8,390,425 B1 3/2013 Cooper et al.
8,390,430 B1 3/2013 Sundstrom et al.
8,390,431 B1 3/2013 Diorio
8,391,785 B2 3/2013 Hyde et al.
8,393,547 B2 3/2013 Kiekhaefer et al.
8,395,482 B2 3/2013 Sadr et al.
8,400,271 B2 3/2013 Sadr
8,421,631 B2 4/2013 Bloy et al.
8,427,315 B2 4/2013 Aiouaz et al.
8,428,515 B1 4/2013 Oliver
8,493,182 B2 7/2013 Hofer et al.
8,690,057 B2 4/2014 Schoening et al.
8,973,831 B1 3/2015 Warther
9,224,125 B2 12/2015 Schoening et al.
9,317,823 B2 4/2016 Muirhead
9,378,484 B1 6/2016 Russell et al.
9,436,902 B1 9/2016 Koepp et al.
9,489,650 B2 11/2016 Schoening et al.
9,747,479 B2 * 8/2017 Twogood ........... G06K 7/10356
11,402,971 B1 * 8/2022 McNamara .......... G06V 40/103
2003/0182193 A1 9/2003 Kawamata
2003/0227392 A1 12/2003 Ebert et al.
2004/0102870 A1 5/2004 Andersen et al.
2004/0225384 A1 11/2004 Onishi et al.
2005/0021561 A1 1/2005 Noonan
2005/0192694 A1 9/2005 Toyoshima et al.
2006/0038684 A1 2/2006 Lahiri
2006/0200261 A1 9/2006 Monette et al.
2006/0208891 A1 * 9/2006 Ehrman ............. G08B 13/2402
340/572.1
2006/0255943 A1 * 11/2006 Hougen ............. G06K 7/10346
340/572.1
2006/0255951 A1 * 11/2006 Roeder .................... H01Q 1/22
340/572.1
2007/0046439 A1 3/2007 Takaku et al.
2007/0106574 A1 5/2007 Kappel et al.
2007/0115137 A1 5/2007 Lyon et al.
2008/0042838 A1 2/2008 Levin et al.
2008/0045218 A1 * 2/2008 Okochi ............... H04L 63/0823
455/436
2008/0068171 A1 3/2008 Ehrman et al.
2008/0079935 A1 4/2008 Vertoprakhov
2008/0136598 A1 6/2008 Chen et al.
2008/0186139 A1 8/2008 Butler et al.
2008/0223274 A1 9/2008 Okuyama
2009/0032367 A1 2/2009 Anthome
2009/0146816 A1 6/2009 Patel et al.
2010/0030353 A1 2/2010 Koishi et al.
2010/0207738 A1 8/2010 Bloy
2010/0219953 A1 9/2010 Bloy
2010/0225480 A1 9/2010 Bloy et al.
2010/0310019 A1 12/2010 Sadr
2011/0032079 A1 2/2011 Bloy et al.
2011/0063113 A1 3/2011 Hook et al.
2011/0068924 A1 3/2011 Muirhead
2011/0090059 A1 4/2011 Sadr
2011/0090061 A1 4/2011 Hofer et al.
2011/0090062 A1 4/2011 Hofer et al.
2011/0095087 A1 4/2011 Master et al.
2011/0240731 A1 10/2011 Lee et al.
2011/0254664 A1 10/2011 Sadr et al.
2011/0279261 A1 11/2011 Gauger et al.
2011/0282476 A1 11/2011 Hegemier et al.
2012/0066019 A1 3/2012 Hinshaw et al.
2012/0091210 A1 4/2012 Koujima et al.
2012/0112913 A1 5/2012 Bloy
2012/0139704 A1 6/2012 Sadr et al.
2012/0188058 A1 7/2012 Lee et al.
2012/0212331 A1 8/2012 Jones et al.
2012/0229257 A1 9/2012 Kim
2012/0257733 A1 10/2012 Kosseifi et al.
2012/0275546 A1 11/2012 Divsalar
2013/0049925 A1 2/2013 Subramanian
2013/0093572 A1 4/2013 Bloy et al.
2013/0099898 A1 4/2013 Bloy
2013/0099901 A1 4/2013 Jones et al.
2013/0126606 A1 5/2013 Smith
2013/0140368 A1 6/2013 Hwan et al.
2013/0233922 A1 9/2013 Schoening et al.
2014/0224870 A1 8/2014 Schoening et al.
2015/0248606 A1 9/2015 Li
2015/0364814 A1 12/2015 Fujita et al.
2016/0078395 A1 3/2016 Schoening et al.
2016/0101019 A1 4/2016 McDowell
2017/0010609 A1 1/2017 High et al.
2017/0053239 A1 2/2017 Schoening et al.
2017/0108895 A1 4/2017 Chamberlin et al.
2018/0089474 A1 3/2018 Ramon et al.
2018/0162640 A1 6/2018 Lee et al.
2018/0247259 A1 8/2018 Borders et al.
2018/0335338 A1 * 11/2018 Matsushita .............. G01H 3/08
2020/0250610 A1 * 8/2020 Schoening ....... G06K 19/07749
2020/0334511 A1 10/2020 Schoening
2020/0381110 A1 * 12/2020 Caputo .................. G16H 10/60
2021/0005971 A1 * 1/2021 Demaretz .............. H01Q 13/10
2021/0035057 A1 2/2021 Jacobus et al.

OTHER PUBLICATIONS

Written Opinion issued in PCT Application No. PCT/US2023/010205 dated May 8, 2023.

* cited by examiner

COMPACT RUGGED RFID ELECTRONICS SYSTEM

CROSS REFERENCE TO RELATED APPLICATIONS

This application claims priority to, and the benefit of the filing date of, U.S. Provisional Patent Application No. 63/266,507, filed Jan. 6, 2022 and entitled "COMPACT RUGGED RFID ELECTRONICS SYSTEM," the entire disclosure of which is hereby incorporated by reference herein.

FIELD OF DISCLOSURE

The present invention relates generally to inventory tracking and management systems and, more particularly, to a compact and rugged electronics system and container of an RFID-based inventory tracking and management system that may be used to manage the tracking and shipping of products in a storage or warehouse environment.

BACKGROUND

Radio frequency identification ("RFID") based inventory tracking and management systems may help facilitate efficient location, identification, and delivery of target products to a target destination within a storage and shipping environment, such as a warehouse. In one example, an inventory tracking and managing system includes a forklift (or other product transportation vehicle) installed with an RFID reader, antennas, user interface, and sensor to wirelessly identify a product on or near the forklift, confirm the correct product is picked up by the forklift via a centralized computer system, and communicate with the operator of the forklift (via the user interface) to deliver the target product to a target destination. As the operator drives the forklift within the environment, the RFID-based inventory tracking and management system (also referred herein as the "RFID-based system") continuously reads location designation RFID tags associated with the surrounding environment and communicates with a centralized computer to alert the operator (via the user interface) that the operator is on the correct track or path in real-time. Generally speaking, the RFID-based tracking system equips a forklift with the tools to read product and location designation RFID tags disposed on products and throughout the warehouse to fill orders accurately.

An example inventory tracking and management system includes an RFID reader and antennas disposed on a forklift, wireless communication devices and nodes disposed on the forklift and throughout the environment to facilitate data collection, storage and processing, a user interface device and detection system disposed on the forklift, and a centralized asset tracking and management device having a product and order database and a tracking and communication application. The user interface device carried by the forklift includes a remote tracking and communication application in communication with the centralized asset tracking and management device and the RFID reader to perform various tasks. The user interface device may include a display or interface screen to visually present information to the forklift operator or other user. The operation of the RFID-based inventory tracking and management system is described, for example, in U.S. patent application Ser. No. 16/855,636 and U.S. patent application Ser. No. 16/370,742, the entire contents of which are incorporated herein by reference.

The inventory tracking and management system includes various location and product designation RFID tags disposed around the environment and on products in the warehouse. For example, location designation RFID tags are disposed on the floor at various entrances, shipping portals, loading bays, and/or support structures throughout the environment; and product designation RFID tags are located on outer surfaces of containers or packaging of products stored in the warehouse environment. Each of the location designation RFID tags and the product designation RFID tags has a unique ID stored in the centralized asset tracking and management device to associate each location designation RFID tag with a particular landmark, and to associate each product designation RFID tag with a particular product of the warehouse inventory. The centralized tracking and communication application communicates with the user interface devices and the RFID tag readers to track and manage the movement of products between the bays, shelves and racks, and the shipping portals or loading bays of the environment.

Each forklift in the environment is integrated into the RFID-based system by installing a number of electronic components onto the forklift, connecting the forklift battery to the components, and connecting the components to each other. The connections required for installation create a complicated web of electrical wires. For example, the RFID reader, antennas, sensor, controller/transmitter, and user interface are all installed onto the forklift and draw power from the forklift battery. The RFID reader is electrically wired to multiple antennas, user interface, a power source, and a transmitter/controller; the transmitter/controller is electrically wired to the sensor or detection device disposed on the forklift (for example, the tongs of the forklift), the power source, the RFID reader, and is in communication with the user interface; and the sensor is electrically wired to the power source and transmitter/controller.

Retrofitting each forklift or vehicle within a storage and shipping environment with the various components of the RFID-based tracking and management system is time consuming, complicated, and requires specialized knowledge. The wired connections installed and disposed on the forklift are not only difficult to set up, but are also susceptible to disconnection when the forklift experiences rough terrain, impact, or general vibrations during the course of operation. Moreover, installation can be further complicated when the environment has different models of forklifts having various battery capacities and voltages. In this case, installation of the RFID-based system on one forklift could look very different from installation on a different forklift used in the warehouse environment.

SUMMARY

A compact RFID electronics system and container as described herein simplifies integrating a forklift with an RFID-based tracking and management system. The compact RFID electronic container can include a voltage converter, regulator, charge guard, and/or transmitter/controller with intuitive connection ports to facilitate power connection between the forklift battery and the RFID reader, forklift computer, and/or sensor mounted to the forklift. The container is pre-assembled, thereby eliminating the need for an operator to connect the transmitter/controller or forklift battery directly to any of the components on the forklift. Rather, the container includes connection ports preconfigured to make the necessary communication and power connections between the internal components (i.e., the voltage converter, regulator, transmitter/controller, charge guard, and/or RFID reader in some examples) and the external components (i.e., the RFID reader in some examples, sensor, user interface device, and power source). The compact and simplified RFID electronics container eliminates the need for an operator or an installer with specialized knowledge to integrate a forklift or other vehicle in a warehouse/manufacturing environment into an RFID-based tracking and managing system.

In some cases, the container includes a plurality of connection ports disposed through one or more walls of the housing of the container to facilitate installation of the RFID reader, sensor, and user interface device on the forklift. The connection ports are arranged for intuitive assembly, and may include color-coding and/or locking mechanisms, to ensure proper connection between the external components mounted on the forklift and the container. The compact RFID electronics container is pre-assembled so that the internal components are connected appropriately within the housing of the container to facilitate connections between the container and the external components on the forklift. So configured, the container may be configured to deliver the appropriate voltage from the forklift battery to the external components, and arrange wireless and wired communications between external components and internal components of the container.

Finally, the compact RFID electronics container is ruggedized to protect the internal and external electrical connections of the container from being disconnected or otherwise disrupted during operation of the forklift. In a warehouse environment, the forklift or other transport vehicle is often exposed to vibrations, turbulence, and/or other environmental impact when picking up, delivering, and dropping off products. The internal components are protected by the walls of the container, and the connections between the container and external components are secured through locking mechanisms. Moreover, the internal components may be welded, glued, fastened or otherwise secured within the container in a manner that makes them less susceptible to movement and electrical disconnections during use, thereby making the components ruggedized.

In some examples, the container may be arranged to house the RFID reader in addition to the transmitter/controller, voltage converter, and regulator. In this example, the RFID reader is an internal component and is arranged to easily connect with one or more antennas mounted to the forklift and externally disposed relative to the container.

DETAILED DESCRIPTION

Figure 1:
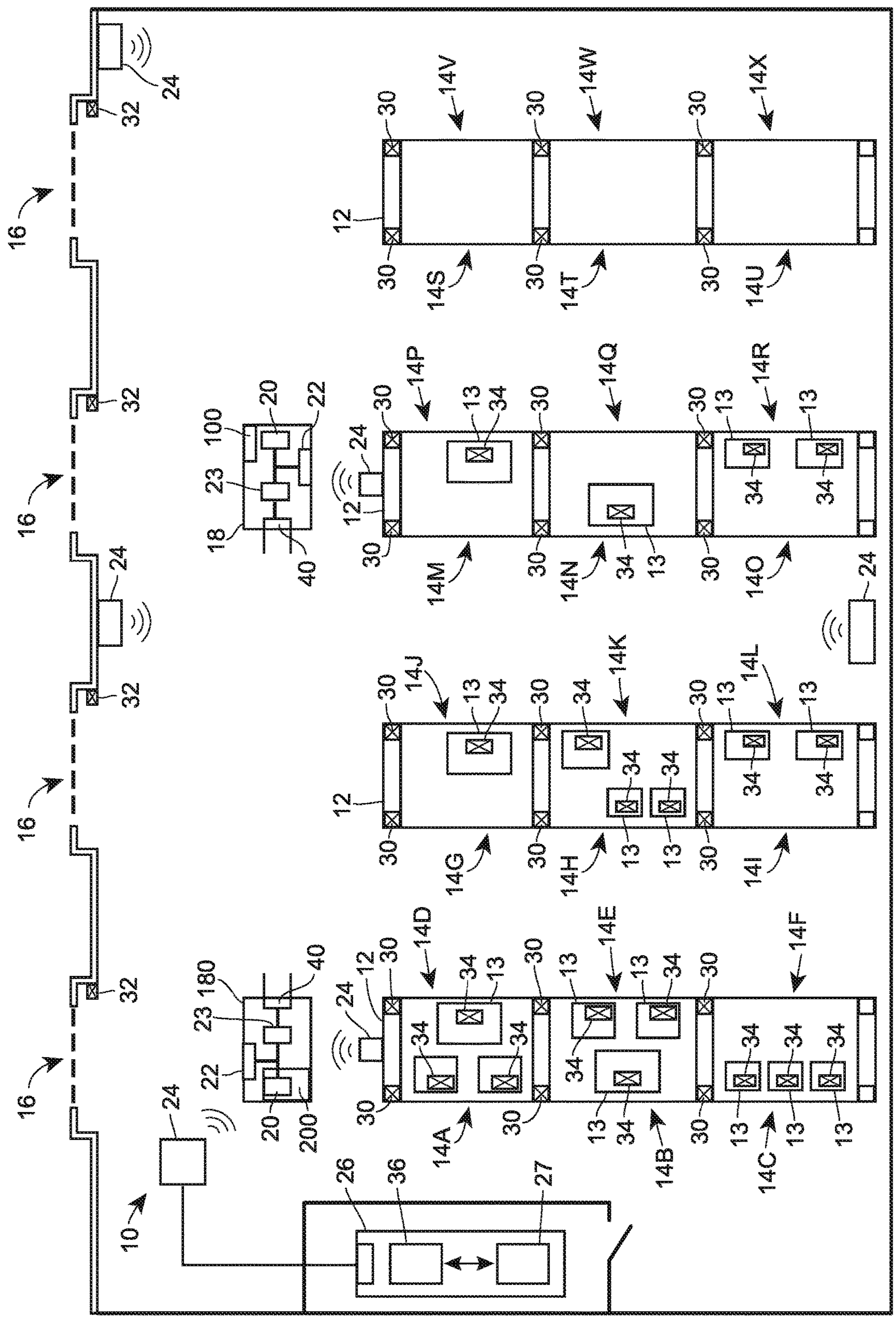
FIG. 1 is a top view of an example, storage and shipping environment in which an RFID-based inventory tracking system is located.

FIG. 1 depicts a top view of an example storage and shipping environment 10 (e.g., a warehouse, storage facility) with one or more forklifts 18, 180 integrated into an RFID-based inventory tracking system using a compact container 100, 200 of the present disclosure. The RFID-based inventory tracking system may be used to track the location of various products stored in the environment 10 and moved for delivery to a target destination, such as a delivery vehicle. The example compact RFID electronics containers 100, 200 are integrated with forklifts 18, 180, respectively, to carry out the necessary operations of the tracking and shipping environment. Although forklifts 18, 180 are described herein, it should be appreciated that the forklift 18, 180 may instead be a different type of mobile equipment using a battery. Moreover, although a storage and shipping environment 10 (such as a warehouse) is described, it should be appreciated that the storage and shipping environment 10 may include any of various environments in which the forklift 18, 180 (and/or other mobile equipment) can operate (such as a manufacturing environment or any other environment necessitating movement of items via machinery).

Generally speaking, the forklifts 18, 180 with integrated compact containers 100, 200 move about the environment 10 to pick up products 13 stored on storage shelves 12 in various bays 14A-14X and deliver the products 13 to loading bays 16 for shipping. Likewise, the forklifts 18, 180 may also pick up new products from the loading bays 16 (or from trucks at the loading bays 16) and place the new products at any of the various bays 14 of the shelves 12 for storage in the environment 10. The forklifts 18, 180 may also move products 13 between shelves 12 and between bays 14. Each forklift 18, 180 of FIG. 1 is equipped with an RFID reader 20, a wireless communication device 22 (e.g., wireless routers and gateways), a user interface device 23, a sensor based detection device 40, and multiple antennas 21 (to be illustrated in FIGS. 2 and 4). The RFID reader 20 and antennas 21 identify the products at various locations by detecting the location and product designation RFID tags 30, 32, 34 disposed throughout the warehouse and on each product. The RFID reader 20 and user interface device 23 communicates data associated with detected products and/or locations with the centralized computer 26.

Each of the RFID tags 30, 32, and 34 has a different and unique ID associated therewith and these IDs are known by an asset tracking and management device 26 or centralized computer, so that the asset tracking and management device 26 can associate each location designation RFID tag 30, 32 with a particular bay 14 or a loading bay 16 or another position within the storage facility, and each product designation RFID tag 34 with a particular product 13. The centralized computer 26 includes a product and order database 27 and a centralized asset tracking and management application 36 to track and store data related to the products and movement of the forklift 18, 180. The product database 27 and application 36 will be discussed in more detail below.

Figure 2:
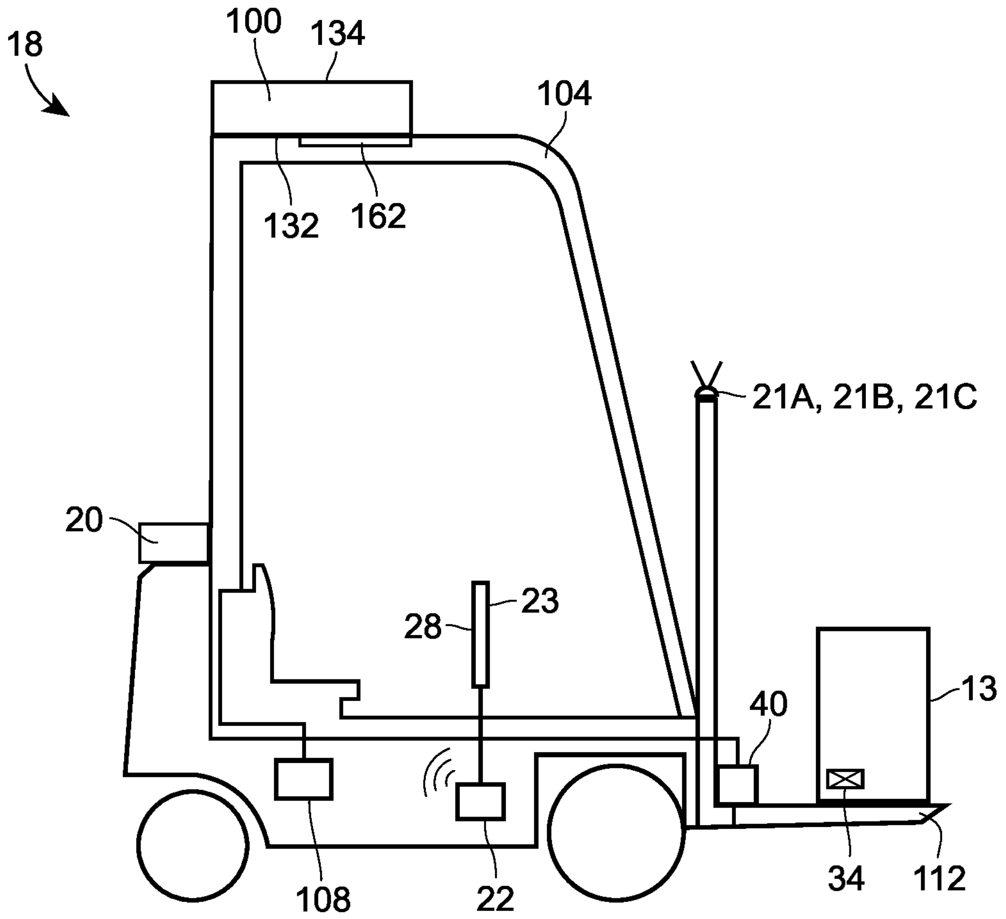
FIG. 2 is a diagram of a movable device carrying a first example compact RFID electronics container and other RFID tracking system components assembled in accordance with the teachings of the present disclosure.

In FIG. 2, a first example ruggedized compact RFID electronics container 100 is mounted to a cage 104 of a forklift 18. Generally speaking, the compact container 100 converts battery power from a forklift battery 108 to power the RFID reader 20, sensor 40, and user interface device 23 carried by the forklift 18. Additionally, the container 100 facilitates communication between the transmitter/controller, sensor 40, RFID reader 20, and portable user interface device 23. In some embodiments, the container 100 can include a backup battery disposed therein, e.g. to provide power to the container 100 while the forklift 18, 180 is not operating and/or when the forklift battery 108 is depleted. Furthermore, in some embodiments, the container 100 can include a charge guard to protect the forklift battery 108

(and/or the charge guard in the container 100) from excess discharge due to power draw by the container 100. For example, the charge guard may be configured to prevent power draw by the container 100 from the forklift battery 108 and/or backup battery of the container 100 while the forklift 18, 180 is not operating (or alternatively, after a preconfigured duration of time after the forklift 18, 180 is not operating, e.g., fifteen minutes). The RFID reader 20 and the container 100 may be magnetically (or mechanically) and releasably attached to the cage 104 or other magnetic surface of the forklift 18 to facilitate assembly and placement. Additionally or alternatively, the container 100 may be mounted to the forklift 18 using clamps, ties or other securing mechanisms. Preferably, the container 100 is mounted to the forklift 18 in a fixed manner to prevent the container, once mounted, from moving with respect to the forklift 18. In other cases, the container 100 may include a soft material, such as rubber or foam, disposed thereon which is disposed adjacent to the forklift 18 when the container 100 is mounted on the forklift 18. This soft material may act like a shock absorber to reduce the amount of or the intensity of shocks imparted to the container 100 by the forklift 18 during movement and/or use of the forklift 18.

Generally speaking, the container 100 is integrated into the RFID-based system by electronically and communicatively connecting various components carried by the forklift 18. For example, the sensor 40 mounted on the forklift 18 detects when a product 13 is near or on the tongs 112 of the forklift 18, and sends a signal to the transmitter/controller disposed in the container 100 upon such a detection. The transmitter/controller communicates the information from the sensor 40 to the user interface device 23, and also signals to the RFID reader 20 to turn on and begin reading RFID tags, via the antennas 21A, 21B, and 21C. When a product antenna 21A reads the product designation RFID tag 34 on the product 13, the RFID reader 20 locks onto the RFID tag 34 and communicates the information to the user interface device 23, which relays the information to the centralized computer 26. The centralized computer 26 analyzes the information received, and communicates to the operator via a user interface at the user interface device 23 whether the product 13, which the forklift 18 is near or is carrying, is a correct product associated with an order to be filled.

As shown in FIG. 2, the user interface device 23 is connected to a network communication device 22, which is in communication with wireless nodes or gateway devices 24 (FIG. 1). The user interface device 23 includes a remote tracking and communication application and a processor that communicates with the asset tracking and management device 26, the RFID reader 20, transmitter/controller of the container 100, 200, and the wireless communication node or device 22 on the forklift 18, 180 to perform various tasks.

Figure 3:
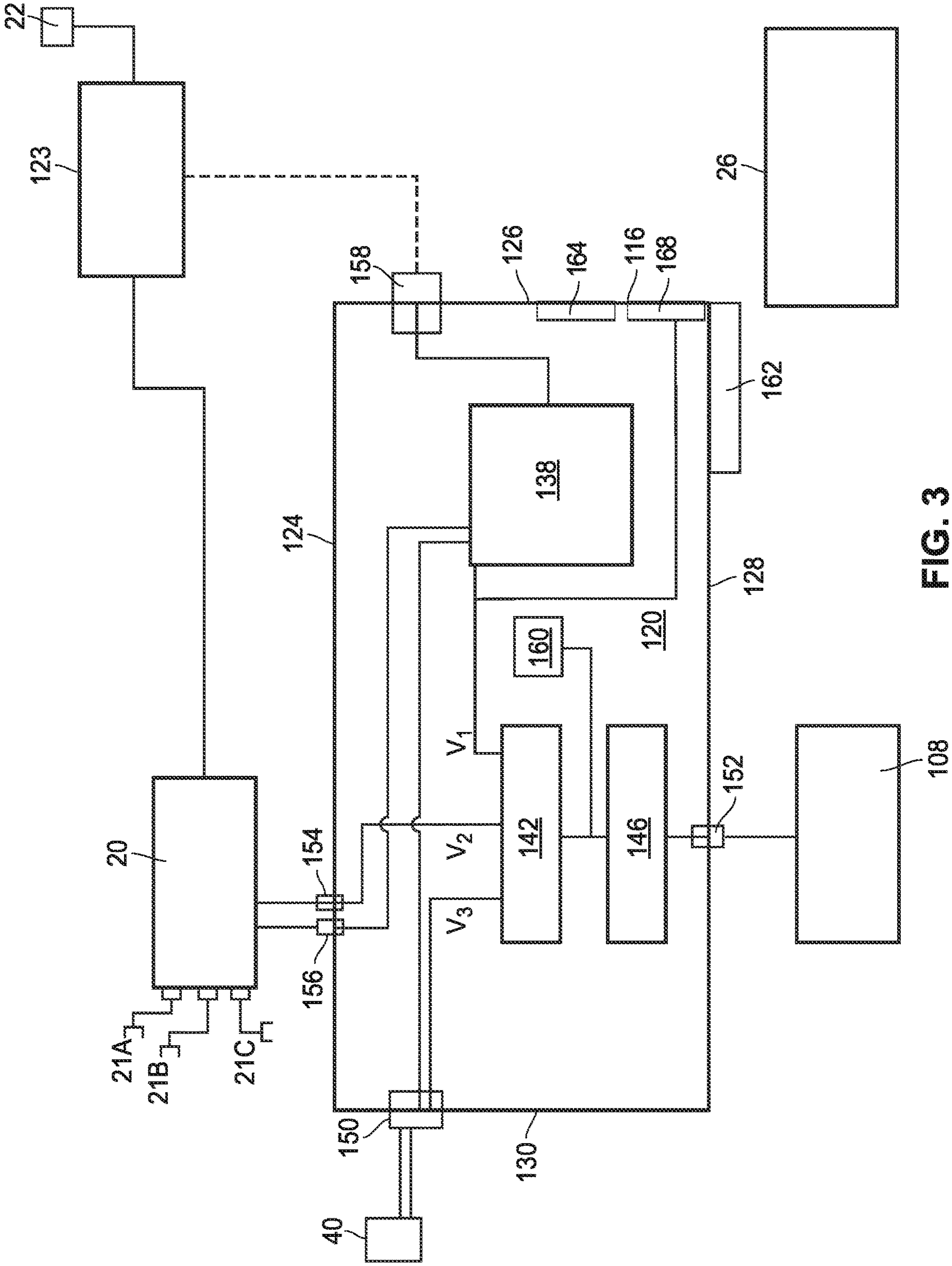
FIG. 3 is a diagram of the container of FIG. 2 assembled in accordance with the teachings of the present disclosure.

FIG. 3 illustrates an example diagram of the compact RFID electronics container 100 of FIG. 2. The container 100 includes a plurality of ruggedized connection ports 150, 152, 154, 156, 158, which may be used to connect a transmitter/controller 138, a power or voltage converter 142, a voltage regulator 146, a heat sink 164, and/or a fan 168 with the RFID reader 20, sensor 20, user interface device 23, and/or battery 108 mounted or carried by the forklift 18. The connection ports 150, 152, 154, 156, 158 are intuitive and simplified to facilitate assembly of, and integration of, the RFID components on the forklift 18 with the components within the container 100, and avoid incorrect installation of the container 100 on the forklift 18 described with reference to FIG. 2. For example, connection ports 150, 154, and 158 may communicatively couple the RFID reader 20, the sensor 40, and the user interface 23, respectively, with the transmitter/controller 138 disposed in container 100.

Generally speaking, the sensor 40 is communicatively coupled with the transmitter/controller 138 through the connection port 150. In one example, when a weight, for example, is detected on the tongs 112 of the forklift 18, the sensor 40, which may be a weight sensor, such as a strain gauge, communicates with the transmitter/controller 138 that a product is placed on the tongs 112. The transmitter/controller 138 then sends a signal to wake up or turn on the RFID reader 20 (via the connection port 154) to activate the antennas 21A, 21B to start reading the product designated RFID tag 34 of the product 13 on the forklift 18. The RFID reader 20 receives a reading of the one or more product antennas 21A, 21B sends the unique identifier of the RFID tag 34 to the user interface device 23. The user interface device 23 processes and locks onto the RFID tag 34 and communicates with the centralized computer 26 to determine whether the product 13 carried by the forklift 18 is a correct product. The user interface at the user interface device 23 displays a message to the operator, indicating whether or not the product 13 on the tongs 112 of the forklift 18 is the correct product. In some examples, the sensor 40 may send a signal of the actual weight or displacement of the product 13 to the transmitter/controller 138, which may communicate this value to the user interface at the user interface device 23. The user interface device 23 receives and relays the weight information of the product 13 to the centralized computer 26 to compare the measured weight with a stored weight to assist in determining if the product 13 is the correct product or if the product is damaged (as evidenced by a change in weight, for example). This measurement may also assist the computer 26 to determine if the product 13 being retrieved includes enough material for the order being fulfilled. For example, various products 13 may be rolls of material from which material for an order is taken, with the remaining material on the roll being placed back on the shelf for later use for another order. Tracking the weight of the product 13 may assist in assuring that enough product is actually available (on a roll for example) for a particular order, when the product 13 is picked up.

The container 100 also receives power from the forklift battery 108 (via connection port 152) to deliver power the transmitter/controller 138, the sensor 40, and the RFID reader 20. Specifically, the power or voltage regulator 146 receives power from the forklift battery 108 via connection port 152 and regulates the power to produce a sustainable and consistent voltage to the voltage converter 142. As shown in FIG. 3, the voltage converter 142 receives the regulated voltage from the regulator 146 and converts the voltage into various voltages V1, V2, V3 to power the different components of the system. In particular, the voltage converter 142 delivers a first voltage V1 to the transmitter 138, a second voltage V2 to the RFID reader 20, and a third voltage V3 to the sensor 40. Of course, the voltages V1-V3 could be any desired voltage (and is typically a DC voltage although one or more could be AC voltages). Generally, the voltages V1-V3 will be selected based on the requirements of the components being powered. Moreover, the voltage converter 142 may provide one, two, three or any other number of different power signals or voltages to the components of the RFID system, and is not limited to three voltages or power signals.

As will be understood, the container 100 includes a housing 116 with an interior volume 120 and a plurality of walls defining the interior volume 120. The plurality of walls include walls 124, 126, 128, and 130 (as labeled in FIG. 3), and further include walls 132 and 134 (as labeled in FIG. 2). The container 100 includes the transmitter/controller 138, the voltage converter 142, the power regulator 146, and a plurality of connection lines disposed in the interior volume 120. The plurality of connection ports 150, 152, 154, 156, 158 are disposed through the plurality of walls 124, 126, 128, 130 to electrically connect the components disposed in the interior volume 120 with the RFID reader 20, the power supply 108, and the sensor 40, which are disposed externally relative to the housing 116 of the container 100.

In the example of FIGS. 2 and 3, the container 100 is a rectangular box including four sidewalls 124, 126, 128, 130, a bottom wall 132, and a top wall 134. In other examples, the container 100 may have a different shape, for example, a hemispherical shape with a dome-shaped wall and a flat wall defining the interior volume 120. In the example of FIGS. 2 and 3, the container 100 entirely encloses the electronic components disposed in the interior volume 120 and protects these elements from the surrounding environment. The top wall 134, for example, may be removably coupled from the one or more sidewalls 124, 126, 128, 130 to provide access to the interior volume 120. However, in other examples, the container 100 may be open or partially enclosed.

The plurality of connection ports 150, 152, 154, 156, 158 are disposed through the walls 124, 126, 128, 130 of the housing 116 to connect components disposed in the interior volume 120 of the container 100 (i.e., the regulator 146, the voltage converter 142, the transmitter 138, the heat sink 164, the fan 168, the RFID reader 20, etc.) with the components externally disposed relative to the container housing 116 (i.e., the RFID reader 20, the sensor 40, the user interface device 23, the battery 108, etc.). For example, the sensor connection port 150 is disposed through the fourth wall 130 to connect the sensor 40 to the transmitter 138.

The first connection port 154 is disposed through the first wall 124 to connect the RFID reader 20 to the voltage converter 142. The second connection port 152 is disposed through the third wall 128 of the housing 116 to connect the voltage converter 142 and regulator 146 to the power supply 108. The third connection port 156 is disposed through the first wall 124 to connect the RFID reader 20 to the transmitter 138. Of course, the connection ports 150-158 may be disposed in any of the walls or sides of the container 100 and multiple connection ports 150-158 may be disposed in any single wall or side of the container 100.

The container 100 is ruggedized to protect both internal and external electrical connections between the connected components of the RFID-based system. The wires connecting the internal components (i.e., regulator 146, voltage converter 142, transmitter 138, the heat sink 164, the fan 168, RFID reader 20) to the connection ports 150, 152, 154, 156, and 158 may be fastened or secured (e.g., via soldering) to a surface in the interior volume 120 of the container 100 (e.g., a circuit board or interior surface of the bottom wall 132) to minimize disruption and movement of the internally disposed wired connections. Additionally, the connection ports 150, 152, 154, 156, and 158 disposed through the one or more walls include (or may be configured to receive) mating connectors to provide an additional form of security to the wired connections between the container 100 and the external components (e.g., the RFID reader 20, the sensor 40, the user interface device 23, the battery 108, etc.) mounted on or carried by the forklift 18. These security and attachment features beneficially ruggedize the container 100 and the wired connections with the components of the forklift 18 to minimize disruption and disconnection of the RFID-based system when the forklift 18 experiences impacts, vibrations, turbulence, or other disturbances from the environment 10. The electrical connectors of the container 100 and components mounted on the forklift 18 may be, for example, screw-in, push-pull, bayonet, break-away, twist-lock, plug-in, push-to-lock, press-fit, crimp, flange, male-female, shielded, sealed, weld, spring, or hybrid connectors. Some specific examples include BNC, SMA, SMB, SMC, and UHF connectors. Other electrical connectors may also be used that are suitable for high-shock and vibration applications. Additionally, or alternatively, the connection ports 150, 152, 154, 156, 158 may be color-coded to correspond with colored wires that are to be connected to the external components.

In some examples, the connecting wires and cables used for connecting the externally disposed components of the forklift 18 to the container 100 may be pre-configured to facilitate assembly. For example, the sensor 40 may be connected to the sensor connection port 150 using a nine foot 24/4 shielded 4-wire signal cable. The RFID reader 20 may be connected to the first connection port 154 using an 18 inch 22/2 shielded 2-wire 24V cable, and to the third connection port 156 using an 18 inch 22/2 shielded 2-wire relay contact. The power source 108 may be connected to the second connection port 152 using a 10 foot 18/2 shielded 2-wire cable. Other cable lengths and types may be used.

The container 100 may include additional components requiring power from the voltage converter 142, such as, for example, the internal fan 168, to regulate the internal temperature of the container 100. In other examples, the container 100 may include the heat sink 164 in the interior volume 120 of the housing 116, or on the exterior of the housing 116, or coupled between the interior and the exterior of the housing 116 to regulate the internal temperature of the container 100.

Each voltage V1, V2, V3 may be set depending on the different requirements of the transmitter 138, the RFID reader 20, and the sensor 40. For example, the voltage converter 142 can either be fixed or configurable. With a fixed voltage converter 142, the voltages V1, V2, and V3 are predetermined based on the power requirements of the components that are coupled to the voltage converter 142. With a configurable voltage converter 142, the voltages V1, V2, V3 may be adjusted, e.g., either manually via switches, buttons, knobs, or through software via the user interface device 23 or other configuration device, when connecting the voltage converter 142 to the various components of the container 100. In some examples, the voltage converter 142 may include security screws or other security features to protect the settings of the voltage converter 142 or to lock the configurable settings of a configurable voltage converter 142. In yet another example, the housing 116 of the container 100 may include switches externally accessible relative to the interior volume 120 of the container 100 to allow an installer to adjust or configure the voltage settings of the voltage converter 142 in the field without opening the container 100. These settings may also be protected by any desired locking mechanism, such as a set screw or covering plate.

In the example illustrated in FIG. 3, the voltage converter 142 is separate from the regulator 146. However, in some examples, the voltage converter 142 may be a voltage regulator and converter integrated as a single unit. In the example where the regulator 146 is separate and distinct from the voltage converter 142, the regulator 146 is coupled to the second connection port 152 to receive a power input from the power source 108 (e.g., a battery of the forklift 18 or movable device). The regulator 146 receives an input voltage (e.g., 72 volts, 24 volts, etc.) depending on the power source 108, and delivers the voltage to the voltage converter 142. The voltage converter 142 is configured to receive the voltage from the regulator 146 and to convert the input voltage and deliver output voltages to the components disposed inside and outside of the container 100. For example, the voltage converter 142 may be configured to receive an input voltage of 72 volts and provide output voltages of 24 volts, 12 volts, 3.5 volts, etc., to the connected components.

The arrangement of the connection ports 150, 152, 154, 156 of the container 100 in FIG. 3 may be reconfigured for optimizing space. In FIG. 3, the sensor connection port 150 is disposed through the fourth sidewall 130 of the housing 116, the second connection port 152 is disposed through the third sidewall 128 of the housing 116, the first and third connection ports 154, 156 are disposed through the first sidewall 124 of the housing 116, and the fourth connection port 158 is disposed through the second sidewall 126 of the housing 116. However, in other examples, the connection ports 150, 152, 154, 156, 158 may be disposed thorough different walls, including a top wall or cover or bottom wall of the housing 116. In some examples, one or more connection ports 150, 152, 154, 156, 158 are disposed through the same wall of the container 100 so that all wires are coupled to the container 100 in one location. The location and positioning of each connection port 150, 152, 154, 156, 158 may be determined based on the location of external elements relative to the mounting location of the container 100 on the forklift 18, the location of external elements on the forklift 18 relative to the internal components of the container 100, and/or the location of the internal components relative to the other internal components of the container 100.

Optionally, the container 100 may include a back-up power source, such as a battery 160 (which may be a rechargeable battery, such as a lithium ion battery), disposed in the interior volume 120 of the housing 116 in case the container 100 becomes disconnected from the battery 108 of the forklift 18 or external power source, and/or a backup battery of the container 100 becomes temporarily drained. In FIG. 3, the back-up battery 160 is connected between the voltage converter 142 and the regulator 146, and therefore is connected to the power source 108. During normal operation, the power source 108 provides power and charges the back-up battery 160. When the power connection between the container 100 and the power source 108 is interrupted or disconnected, the voltage converter 142 draws power from the back-up battery 160 to supply power to the internal components of the container 100 and external components on the forklift 18. The back-up battery 160 preferably provides a power of the same voltage (i.e., leaving the regulator 146) to the voltage converter 142.

Figure 4:
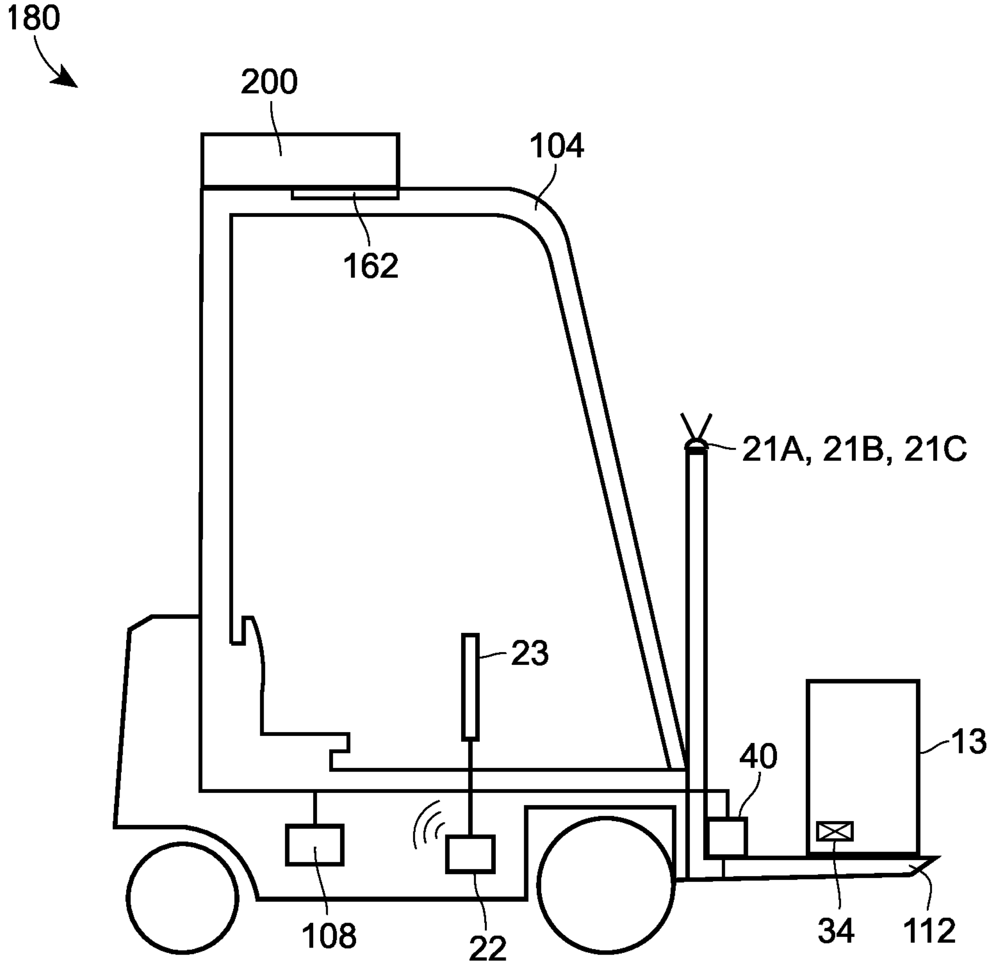
FIG. 4 is a diagram of a movable device carrying a second example compact RFID electronics container and other RFID tracking system components assembled in accordance with the teachings of the present disclosure.
Figure 5:
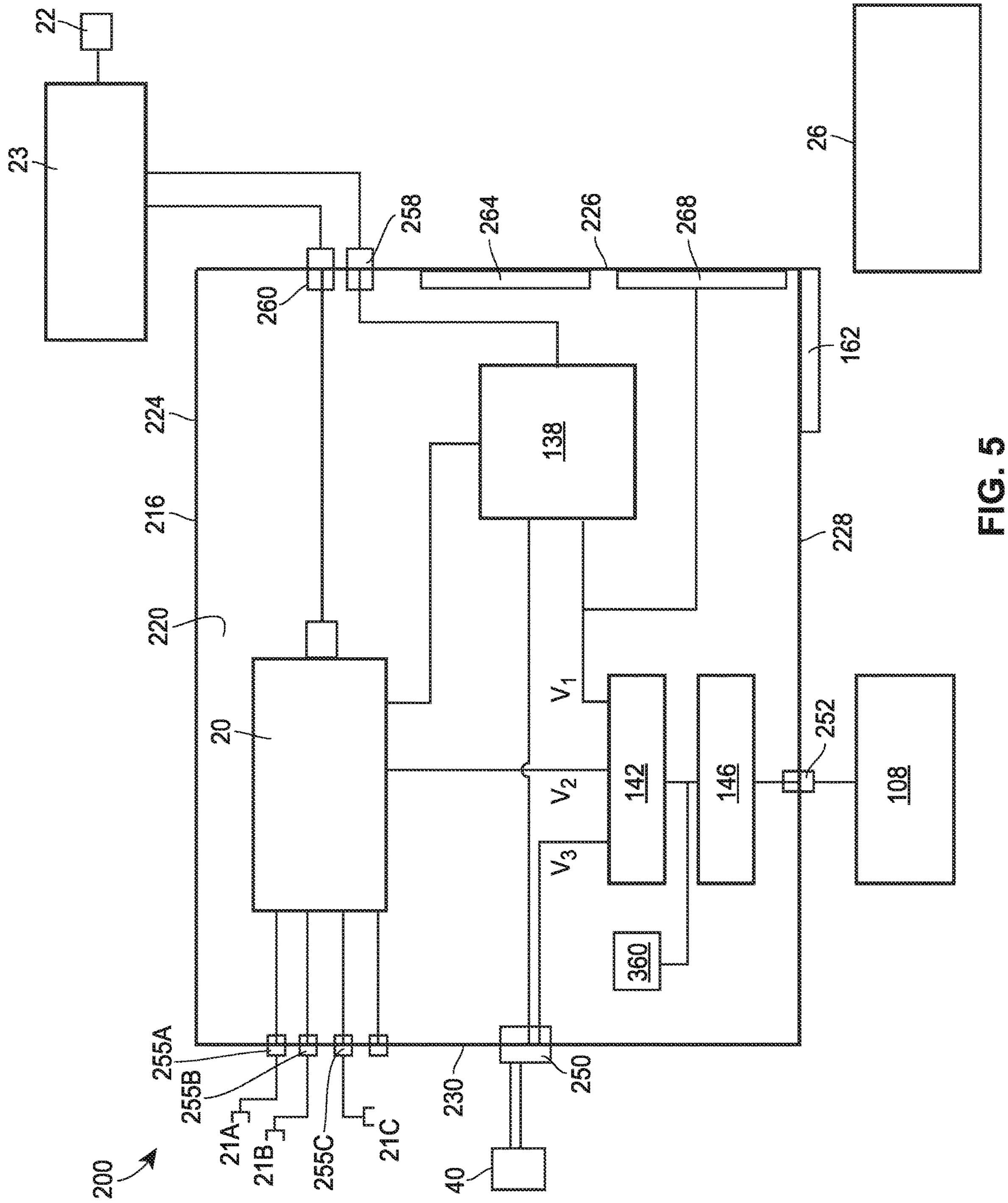
FIG. 5 is a diagram of the container of FIG. 4 assembled in accordance with the teachings of the present disclosure.

In another example container 200 of FIGS. 4 and 5, the RFID reader 20 is disposed in an interior volume 220 of a compact RFID electronics container 200. FIG. 4 depicts a forklift 180 of FIG. 1 that is similar to the forklift 18 of FIGS. 1 and 2 but that carries the second example container 200. The second example container 200 is similar to the first example container 100 of FIGS. 2 and 3, and thus it will be appreciated that the second example container 200 has a slightly different arrangement of components, but operates in a similar manner as the first example container 100 within the RFID-based tracking system. Accordingly, the same or similar components of the second example container 200 will retain the same reference numbers as outlined above with respect to the first example container 100.

In FIG. 5, the second example container 200 includes a housing 216 with an interior volume 220 and one or more walls 224, 226, 228, and 230 at least partially defining the interior volume 220. A voltage converter 142, a transmitter 138, and an RFID reader 20 are disposed in the interior volume 220 of the housing 216. The voltage converter 142 is electrically coupled to the transmitter 138 and the RFID reader 20, and the transmitter 138 is communicatively coupled to the RFID reader 20. A sensor connection port 250 is disposed through one of the sidewalls 230 of the housing 216 and is arranged to connect the transmitter 138 with the sensor 40 externally disposed relative to the housing 216 (e.g., mounted to the tongs 112 of the forklift 180). A first connection port 252 is disposed through one of the housing sidewalls 228 and is arranged to connect the voltage converter 142 with a power source 108 externally disposed relative to the housing 216. The power source 108 may be the vehicular battery of the forklift 180 or another power source. Similar to the regulator 146 of the first example container 100, the regulator 146 of the second container 200 is separate and distinct from the voltage converter 142 and connects the power source 108 with the voltage converter 142. However, in other examples, the voltage converter 142 may be a voltage regulator and converter. The second example container 200 may include a back-up battery 360 disposed in the container housing 216 and may be arranged in the same manner as the back-up battery 160 is connected to the voltage converter 142 and regulator 146 or in any other desired manner as would be known to those of ordinary skill in the art.

As shown in FIG. 5, the RFID reader 20 is electrically coupled to one or more antennas 21A, 21B, and 21C externally disposed relative to the housing 216 of the container 200. Each antenna 21A, 21B, and 21C is coupled to the RFID reader 20 by a respective one of I/O ports 255A, 255B, and 255C disposed through the sidewall 230 of the housing 216. Each I/O port 255 may be configured (e.g., with colors or labels) to ensure proper connection with the corresponding antenna 21A, 21B, and 21C.

The container 200 also includes second and third connection ports 258, 260 disposed in the second sidewall 226 of the housing 216. The second connection port 258 communicatively couples the portable user interface device 23 with the transmitter/controller 138, and the third connection port 260 communicatively couples the RFID reader 20 to the portable user interface device 23. The container 200 includes a heat sink 264 and a fan 268 to regulate the internal temperature of the interior volume 220 of the container 200. However, in another example, the container 200 may include a Bluetooth or other short range communications device to facilitate wireless communication between the RFID reader 20 and the user interface device 23. In this example, the third connection port 260 would be unnecessary.

The arrangement of the connection ports 250, 252, 258, 260 and I/O ports 255 of the container 200 may be configured in other manners, and the container 200 is not limited to the arrangement illustrated in FIG. 5. In FIG. 5, the I/O ports 255 and the sensor connection port 250 are disposed through the fourth sidewall 230 of the housing 216, the second connection port 252 is disposed through the third sidewall 228 of the housing 216, and first and third connection ports 258, 260 are disposed through the second sidewall 226. However, in other examples, the connection ports 250, 252, 258, 260 and I/O ports 255A, 255B, 255C may be disposed thorough different walls, including a top wall or cover or bottom wall. In some examples, one or more connection ports 250, 252, 258, 260 and I/O ports 255A,

255B, 255C are disposed in the first sidewall 216. In some examples, the connection ports 250, 252, 258, 260 and I/O ports 255A, 255B, 255C are disposed through the same wall of the container 200. The location and positioning of each connection port 250, 252, 258, 260 and I/O ports 255A, 255B, 255C may be determined based on the location of external elements of the forklift 180 relative to the mounting location of the container 200 on the forklift 180, the location of the external elements on the forklift 180 relative to the internal components of the container 200, and/or the location of the internal components relative to the other internal components of the container 200.

The connection ports of the first and second containers 100, 200 are ruggedized and shock-resistant to maintain the electrical connections between the external components (e.g., the RFID reader 20, the sensor 40, the user interface device 23, the battery 108, etc.) and internal components (e.g., the transmitter 138, the voltage converter 142, the regulator 146, the RFID reader 20, etc.) of the containers 100, 200. The connection ports may include locking or other security features to resist disconnection from the external components as the forklift 18, 180 experiences knocks, jolts, and bumps. The connection ports may also be varied from one another to facilitate assembly with external components. For example, the sensor connection port 150, 250 that is arranged to connect with a sensor 40, for example, may include a color that matches a color wire or connection of the sensor 40. The second connection port 152, 252 may be a different color than the sensor connection port 150, 250 to match with a power supply connection. In other examples, the different connection ports may be different colors and/or may use different physical connector configurations so that a physical connection with the wrong component is avoided. Some connection ports may be arranged to receive locking connectors of external connecting wires and lines, and other connection ports may be without locking connectors. To facilitate integration of the container 100, 200 within the RFID-based system, and particularly installation and assembly onto a forklift 18, 180, each container 100, 200 may be packaged with preconfigured wires and connectors designed for intuitive assembly. Each wire connecting the container 100, 200 to an external component may be a predetermined length to ensure that the correct connections are made.

The containers 100, 200 may be easily attached or mounted to the forklift 18, 180 to facilitate set up on-site. As shown in FIGS. 2-5, each container 100, 200 includes a magnet 162 to attach the container 100, 200 to the cage 104 of the forklift 18, 180. The magnet 162 can be any magnet strong enough to attach the container 100 and RFID reader 20 to a magnetic surface, such as, for example, a rare earth magnet. To assemble, an operator may first attach the container 100, 200 to a magnetic surface of the forklift 18, 180, such as the top of the rumble cage 104, and then make the electrical connections via the intuitive, preconfigured wires and connectors. The container 100, 200 may be mounted to the forklift 18, 180 in other ways such as, for example, clamps, screw plates, adhesive, welding, zip-ties, plastic-ties, tape, hook-and-loop fasteners, hooks, hangers, or any combination mounting techniques.

The user interface device 23 is typically disposed on the forklift 18, 180 in a position that is viewable and accessible by the forklift operator. In particular, the user interface device 23 may be positioned, for example, to the right side of the forklift operator. Generally speaking, the user interface device 23 may be a standalone computing device, such as a laptop, a tablet device, a phone or other handheld device, etc. In some examples, the user interface device 23 may be incorporated or integrated into the forklift 18, 180. As illustrated in FIG. 2, the user interface device 23 may also include a display or interface screen 28 that may be used to visually present information to the forklift operator or other user. The user interface 23 may include, or may be connected to, a speaker or other audible device to provide sounds, alarms, etc. to the forklift operator or other user based on the input received and processed by the user interface 23. Additionally, the user interface device 23 may include an operator input device, such as a touch screen, a keyboard, etc., that may be used to accept inputs from the forklift operator or other user. As also illustrated in FIGS. 2 and 4, the user interface device 23 is communicatively coupled to the RFID reader 20, the wireless communication device 22, and the transmitter 138, as shown in FIGS. 3 and 5. As previously described with respect to FIG. 2 and FIG. 4, the user interface device 23 may be electrically coupled to the container 100, 200 to draw power from the container 100, 200. Alternatively, in some embodiments, the user interface device 23 may remain electrically coupled to the forklift battery 108 while remaining communicatively connected components of the container 100, 200, so as to draw power from the forklift battery 108 while the forklift 18, 180 is operational. In this arrangement, the user interface device 23 may, in embodiments, be configured to turn off after a preconfigured duration of time after the forklift stops operating (e.g., so as to not run the user interface device and, in turn, the RFID reader 20, when the forklift 18, 180 is not operating).

Each forklift 18, 180 is equipped with multiple antennas 21A, 21B, and 21C, connected to the RFID reader 20, that detect and read location and product designation RFID tags 30, 32, and 34. The multiple antennas 21A, 21B, and 21C help determine the position of the forklift 18, 180 in the environment 10 and, in turn, the location of the product 13 to be picked up or delivered. The antennas 21A, 21B, and 21C may be placed around the forklift 18, 180 to minimize interference with the operation of the forklift 18, 180. In the illustrated examples of the forklifts 18, 180 of FIGS. 2 and 5, multiple front facing antennas 21A, 21B, and 21C are placed toward the front end of the forklift 18 (i.e., facing in the direction towards the tongs 112 of the forklift 18, 180) to detect and read an RFID tag 30, 32, 34 disposed on products 13 and location markers. In some examples, the plurality of antennas 21A, 21B, and 21C can be placed towards the rear end of the forklift 18, 180 (i.e., the side opposite the tongs of the forklift 18, 180) to detect and read one or more RFID tags 30, 32, 34.

Each of the multiple antennas 21A, 21B, and 21C may be coded to detect and selectively read only RFID tags 34 placed on products 13 and RFID tags placed at various locations in the environment 30, 32 (e.g., shelves, bays, loading bays, floor, walls, columns, ceiling, etc.). The antennas 21A, 21B, and 21C may be mounted in different positions on the forklift 18, 180, oriented in different directions, and enabled or turned on at different times to read RFID tags. For example, the first antenna 21A may be coded to read only RFID tags 34 disposed on products 13, the second antenna 21B may be coded to detect and read only RFID tags 30 placed on the storage shelf 12 and the bays 14, and the third antenna 21C may be coded to detect and read only RFID tags 32 on the floor or walls of the environment. As such, each antenna 21A, 21B, 21C may only read the RFID tags 34, 32, and 30 they are coded to read.

In one example, the antenna 21A may be placed on or near the tongs 112 of the forklift 18, 180 and configured to detect the RFID tag 34 of a product 13 that is on or near the tongs

112 (without detecting floor RFID tags 32 or shelf RFID tags 30). The second antenna 21B may be front-facing and configured to detect the RFID tag 30 on the shelf 12 or bay 14 (without detecting product RFID tags 34 or floor RFID tags 32). The second antenna 21B may help identify whether the forklift 18, 180 picks up a product 13 from, or delivers a product 13 to, the correct shelf 12 or bay 14. The third antenna 21C may be configured to detect the location of the forklift 18, 180 by reading floor and wall tags 32 to identify a particular location in the environment (without detecting product RFID tags 34 or shelf RFID tags 30). The third antenna 21C may help identify whether the forklift 18, 180 is delivering or picking up the product to the correct location in real-time.

The transmitter/controller 138 in the container 100, 200 may enable or read the floor tags 32 so that the user interface device 23 and the centralized system 22 can track the whereabouts of the forklift 18, 180 and confirm that the forklift 18, 180 is in the desired or correct place to pick up a product 13 and to track where a product 13 is put down, etc. The container 100, 200 receives signals from each of the antennas 21A, 21B, and 21C, and the transmitter/controller 138 may enable or disable the antennas 21A, 21B, and 21C separately depending on the action of the forklift 18, 180.

Each of the antennas 21A, 21B, 21C depicted in the figures may be one or more antennas, and many configurations and orientations are possible. In one example, the antenna 21A may be front facing and the other antennas 21B and 21C may be rear or downward facing. Each antenna may be selectively turned on by, or used by, the RFID reader 20 to limit the amount of RFID tags that are being read by the RFID reader 20. In another example, the first front facing antenna 21A can be oriented to point straight ahead of the forklift 18, 180, the second front facing antenna 21B can be oriented to point above the forklift 18, 180, and the third front facing antenna 21C can be oriented to point below the forklift 18, 180. It will be appreciated that the antennas 21A, 21B, and 21C may also be oriented to point to the left and right of the forklift 18, 180. Referring back to FIG. 1, the wireless communication nodes or gateways 24 may be located at various locations within the environment 10, such as on the shelves 12, hanging from the ceiling, disposed near the loading bays 16, etc., or other locations to provide wireless communication coverage throughout the environment 10 (and particularly the area traversed by the forklifts 18, 180). The wireless communication devices 22 and 24 may communicate using any desired wireless communications standard, such as an 802.11 protocol, a TCP/IP protocol, a Bluetooth protocol, any Wi-Fi protocol, etc.

Various location designation RFID tags 30 and 32 are disposed around the environment 10 to identify different locations of the environment 10. Each of the tags 30 and 32 may have a known and unique identification number such that the antennas 21B, 21C disposed on the forklift 18, 180 can identify the various location designation RFID tags 30, 32 disposed within the environment 10. In the example of FIG. 1, a different location designation RFID tag 30 is illustrated as being disposed at each of the bays 14A-14X, such as on a pole, support structure, or the floor at the entrance or start of each bay 14. A different location designation RFID tag 32 is located at or near each of the loading bays 16 in a fixed location such as, for example, a wall near the loading bays 16 or the floor near the loading bays 16. The various location designation RFID tags 30 and 32 may be releasably attached to the designated locations.

As previously described, the centralized asset tracking and management device 26 receives and stores the various location and product designation RFID tags 30, 32, 34 read by the RFID-based system, and analyzes the data received with the data stored to confirm or stop the actions of the forklift operator. The centralized asset tracking and management device 26, which may be a user workstation, a server, or any other type of computing device, may be located in a different room or in a more protected environment than the shipping or warehouse floor. The asset tracking and management device 26 includes a centralized tracking and management application 36 that is stored in a memory of, and executed on, a processor of the device 26. The tracking application 36 is communicatively connected to one of the nodes 24 (via a wired or a wireless connection and a communication interface of the device 26) and thus is connected to the wireless communication network within the facility 10. The tracking application 36 communicates with the user interface devices 23, transmitters/controllers 138, and the RFID tag readers 20 to obtain information from, and to provide information to, the user interface devices 23. Additionally, the tracking application 36 tracks and manages the movement of products 13 between the shelves 12 and the loading bays 16, as well as information detected by the sensor 40.

More particularly, the tracking application 36 stores information regarding the RFID tags 30, 32, 34 in the product and order database 27 of the device 26. Likewise, the tracking application 36 stores information for each of the RFID tags 34 associated with each product 13, such as the product name, type, quantity, weight, etc. of the product 13. The tracking application 36 may further create, store, and use a list of orders, order numbers, or job numbers identifying various jobs or shipping orders. In particular, each order may include a list of one or more products 13 that needs to be moved within the environment 10. Each job or order number includes a specific product or group of products and may include the RFID tag or ID numbers for the RFID tags 34 associated with those products 13. For example, when a product 13 first arrives in the environment 10, a unique RFID tag 34 is placed on the product 13 to associate that product 13 with a unique ID that is stored in the product and order database 27 of the tracking application 36.

The tracking application 36 may also store information received from the sensor 40 on the forklift 18, 180. Turning back to FIGS. 2 and 4, the sensor based detection device 40 (e.g., a laser-based detection device, an optical detection device, a weight sensor or strain gauge, an accelerometer, etc.) is communicatively coupled to the user interface device 23 on the forklift 18, 180 (via the transmitter/controller 128) and communicates signals indicative of the existence or non-existence of a product 13 on the tongs 112 or lift of the forklift 18, 180. In the examples of FIGS. 3 and 5, the sensor 40 may be a weight sensor that can detect a weight of the product 13, or a change in weight, to ensure that the correct product is picked up by the forklift 18, 180. For example, the sensor 40 may transmit a measured weight to the transmitter/controller 138, which in turn communicates with the user interface device 23. The user interface device 23 then turns on the RFID reader 20, so the RFID reader 20 operate the antennas 21A, 21B, and 21C, and reads the product designation RFID tag 34 disposed on the product 13 that is on the tongs 112 or lift of the forklift 18, 180. After the RFID reader 20 reads the product designation RFID tag 34, the RFID reader 20 queries the tracking application 36 via the communication network using the communication devices 22 and 24. Once queried, the tracking application 36 analyzes the product designation RFID tag 34 information sent relative to the data stored in the product and order database 27 to determine if the forklift operator picked up the correct product 13. The user interface device 23, in communication with the centralized computer 26, may then visually and audibly alert the forklift operator that the operator picked up the correct product 13, using, for example, a green alert and a first audible alert, or that the forklift operator picked up the incorrect product 13 using, for example a red alert and a second audible alert.

Additionally, or alternatively, the measured weight detected by the sensor 40 may be compared with a weight of the target product 13 stored in the memory of the tracking application 36 to identify whether the product 13 carried by the forklift 18, 180 is a correct product. If the detected weight matches the stored weight, then the centralized asset tracking and management device 26 can send a visual and/or audible message to the operator or driver of the forklift 18, 180, via the user interface device 23, that the correct product is on the forklift 18, 180. If the detected weight does not match the stored weight by a predetermined threshold difference, then the centralized asset tracking and management device 26 can alert the operator or driver of the forklift 18, 180, via the user interface device 23, that the product 13 on the forklift 18, 180 is a damaged or incorrect product.

In another example, the detection device 40 is a laser based detection device having a laser transmitter that directs a laser beam toward the product 13 on the forklift 18, 180 and a detector that detects reflected light from the product 13. The detection device 40 may detect the presence of a product 13 on or near the forklift 18, 180 via a sensor that senses the reflection. When no product 13 is on or near the forklift 18, 180, the laser beam does not reflect off of any product 13 close to the detection device 40. However, if a product 13 is on or near the forklift 18, 180, the light reflects back at a magnitude received by the detection device 40 signaling to the transmitter/controller 139 that a product 13 is on or near the front of the forklift 18, 180.

However, other types of sensors besides lasers could be used in or for the detection device 40 including, for example, electromagnetic sensors (that use other wavelengths of electromagnetic energy to detect the presence of product 13 on or near the forklift 18, 180), sonic detectors, optical detection devices, etc. Further, the detection device 40 may be placed in a location on the front of the forklift 18, 180 that minimizes the possibility of damage due to general wear and tear and/or shifting or sliding products 13 picked up by the forklift 18, 180. The detection device 40 may also be covered to minimize impact damage from products picked up by the forklift 18, 180.

Turning back to FIG. 1, an example method of processing a delivery order using the forklift 18, 180 and integrated compact container 100, 200 of the RFID-based system will be described. When a particular order needs filling (e.g., locating a product or group of products 13 and placing the products 13 on a truck for delivery), the tracking application 36 may generate a signal to the user interface device 23 on one of the forklifts 18, 180 telling the forklift operator to pick up a particular product 13 stored at a particular location, and deliver that product 13 to a particular loading bay 16 for placement on a particular truck. The tracking application 26 may provide the forklift operator with the last known position of the product 13 stored by the product and order database 27. The forklift operator may then drive the forklift 18, 180 to the appropriate bay 14, find the product 13, and pick up the product 13 using the forklift 18, 180, thereby generating a pick-up event.

The detection device 40 on the forklift 18, 180 detects the presence of a product 13 on the forklift 18, 180 and may turn on the RFID reader 20 of the forklift 18, 180, via the transmitter/controller 128 of the container 100, 200. The RFID reader 20 then turns on the antenna 21A and signals the antenna 21A to read the product designation RFID tag 34 on the product 13. The RFID reader 20 may communicate that information to the tracking application 36 via the user interface device 23, using the communication network devices 22, 24. The tracking application 36 may then determine whether the RFID tag ID associated with the product 13 on the forklift 18, 180 is the correct RFID tag ID of the product 13 associated with the order (using the order and product information in the database 27). The application 36 may communicate with the user interface device 23 on the forklift 18, 180 to inform the forklift operator whether or not the correct product for the order is the product 13 on the forklift 18, 180. If the correct product is picked up, the centralized computer 26 registers a pick-up event.

After confirmation (e.g., alarm, signal, message via the user interface 23) that the forklift operator picked up the correct product for the order, the forklift operator transports the product 13 to a targeted loading bay 16 to deliver the product 13 to a delivery truck. As the forklift 18, 180 moves throughout the environment 10 carrying the product 13, the RFID reader 20 (through the use of the antennas 21B, 21C) may continuously identify the location of the of the forklift 18, 180 by detecting the closest location designation RFID tags 30, 32 associated with various landmarks in the environment 10 (e.g., pillars, areas, bays 14, loading bays 16, etc.). The user interface device 23 may receive information detected by the antennas 21B, 21C via the RFID reader 20, and may communicate real-time location information to the tracking application 36 of the centralized computer 26. More particularly, as the forklift operator drives the forklift 18, 180 to a particular loading bay 16, the RFID reader 20, in communication with the antenna 21C of the forklift 18, 180, reads the location designation RFID tag 32 associated with that bay 16 as being the last detected or closest tag 30. The forklift operator may then place the product 13 on a truck at the loading bay 16 and back away from the product 13, thereby removing the product 13 from the forklift tongs 112. The detection device 40 communicates with the user interface device 23 (via the transmitter/controller 138 of the container 100, 200) that the product 13 has been dropped off or has been removed from the tongs 112 of the forklift 18, 180, indicating a drop-off event has occurred at the identified loading bay 16. The transmitter/controller 128 of the container 100, 200 may signal the drop-off event to the user interface device 23, which is in communication with the tracking application 36 of the centralized computer 26. The user interface device 23 communicates the drop-off event and associated location (i.e., last detected location) of the forklift 18, 180 with the central tracking system 26. The tracking application 36 may then determine if the detected loading bay 16 is the targeted loading bay 16 (i.e., the loading bay 16 in which the product 13 is to be placed on a truck for this order). As a result, the centralized tracking computer 26 registers the drop-off event at the location of the product 13 and stores this information in the product database 27.

The results of the pick-up and drop-off events are communicated to the user interface device 23 of the forklift 18, 180 in real time, instructing the forklift operator that they are at the correct loading bay 16. In one example, when the forklift 18, 180 performs a drop-off event, the user interface device 23 or the RFID tag reader 20 of the forklift 18, 180 may send the current location of the forklift 18, 180 (based on the currently detected or last detected location designation RFID tag 32) to the tracking application 36 to determine whether the forklift 18, 180 is at the correct loading bay 16 for the order. The tracking application 36 determines whether the forklift 18, 180 is near or at the appropriate loading bay 16 associated with the truck used for delivering the order. The tracking application 36 then sends a signal to the user interface device 23 of the forklift 18, 180 to indicate to the forklift operator that the forklift 18, 180 is at the wrong truck or loading bay 16 or that the forklift 18, 180 is at the correct truck or loading bay 16.

Finally, although certain systems and assemblies have been described herein in accordance with the teachings of the present disclosure, the scope of coverage of this patent is not limited thereto. On the contrary, while the disclosed systems and assemblies have been shown and described in connection with various examples, it is apparent that certain changes and modifications, in addition to those mentioned above, may be made. This patent application covers all examples of the teachings of the disclosure that fairly fall within the scope of permissible equivalents. Accordingly, it is the intention to protect all variations and modifications that may occur to one of ordinary skill in the art.

What is claimed:

1. An asset management and tracking system for use in a facility, the system comprising:

an enclosure including an interior volume and one or more walls at least partially defining the interior volume;

a voltage converter disposed in the interior volume of the enclosure;

one or more antennas externally disposed relative to the enclosure and configured to detect one or more product designation RFID tags and one or more location designation RFID tags;

a radio frequency identification (RFID) reader coupled to the one or more antennas and configured to read the one or more product designation RFID tags and the one or more location designation RFID tags, the RFID reader electrically coupled to the voltage converter;

a transmitter disposed in the interior volume of the enclosure, the transmitter electrically coupled to the voltage converter to receive a first output voltage of the voltage converter, and the transmitter being communicatively coupled to the RFID reader;

a first connection port disposed through the one or more walls of the enclosure and arranged to removably connect the one or more antennas or the RFID reader with the interior of the enclosure, the voltage converter connected to the RFID reader to provide a second output voltage of the voltage converter to the RFID reader, the second output voltage differing from the first output voltage; and a second connection port disposed through the one or more walls of the enclosure and arranged to removably connect the voltage converter with a power supply externally disposed relative to the enclosure.

2. The system of claim 1, further comprising a sensor for detecting a product, wherein the transmitter communicates with the RFID reader responsive to receiving an input from the sensor.

3. The system of claim 2, further comprising a sensor connection port disposed through the one or more walls of the enclosure and arranged to removably connect the sensor with the interior of the enclosure.

4. The system of claim 1, wherein the first connection port is arranged to connect the voltage converter with the RFID reader.

5. The system of claim 1, further comprising a third connection port disposed through the one or more walls of the enclosure and arranged to removably connect the transmitter with the RFID reader.

6. The system of claim 1, wherein the RFID reader is disposed in the interior volume of the enclosure, the RFID reader being electrically coupled to the voltage converter, and wherein the first connection port is arranged to removably connect the RFID reader with the one or more antennas.

7. The system of claim 1, further comprising a portable communication device communicatively coupled to the RFID reader and the transmitter.

8. The system of claim 7, further comprising a movable device carrying the RFID reader, the enclosure, and the portable communication device.

9. The system of claim 1, further comprising a sensor connection port disposed through the one or more walls of the enclosure and arranged to connect a sensor with the voltage converter or the transmitter.

10. The system of claim 1, further comprising a regulator disposed in the interior volume of the enclosure and electrically coupled to the voltage converter.

11. The system of claim 10, wherein the second connection port is electrically coupled to the regulator.

12. The system of claim 1, further comprising a sensor connection port disposed through the one or more walls of the enclosure and arranged to connect a sensor with the transmitter or the voltage converter.

13. The system of claim 1, further comprising a magnet coupled to the one or more walls of the enclosure, the magnet arranged to releasably couple the enclosure to a movable device.

14. The system of claim 1, wherein the first connection port is includes a first type of removable connector and the second connection port includes a second type of removable connector that is a different type of connector than the first type of connector.

15. The system of claim 1, wherein one or more of the first and second connection ports includes a locking connector.

16. The system of claim 1, wherein the transmitter is communicatively coupled to a portable communication device externally disposed relative to the enclosure.

17. The system of claim 1, wherein the voltage converter is configurable to provide a configurable voltage to one or more of the transmitter, the RFID reader, or a sensor for detecting a product.

18. The system of claim 1, wherein the voltage converter is configured to provide a fixed voltage to one or more of the transmitter, the RFID reader, or a sensor for detecting a product.

19. The system of claim 1, further comprising a heat sink disposed in the interior volume of the enclosure.

20. The system of claim 1, further comprising a fan disposed in the interior volume of the enclosure.

21. A compact RFID electronics container of an inventory tracking and management system, the container comprising:

a housing including an interior volume and one or more walls at least partially defining the interior volume;

a transmitter disposed in the interior volume of the housing, the transmitter including a processor to receive and transmit information;

a voltage converter disposed in the interior volume of the housing, the voltage converter electrically coupled to the transmitter to provide a first output voltage to the transmitter;

a first connection port disposed through the one or more walls of the enclosure and arranged to removably couple one or more antennas or an RFID reader with the interior of the housing, the voltage converter configured to provide a second output voltage of the voltage converter to the RFID reader, the second output voltage differing from the first output voltage; and a second connection port disposed through the one or more walls of the housing and arranged to removably connect the voltage converter with a power source externally disposed relative to the housing.

22. The container of claim 21, further comprising a sensor connection port disposed through the one or more walls of the housing and arranged to removably connect the transmitter with a sensor externally disposed relative to the housing.

23. The container of claim 22, wherein the transmitter is arranged to receive information from the sensor externally disposed relative to the housing.

24. The container of claim 22, wherein the voltage converter is electrically coupled to the sensor connection port.

25. The container of claim 22, wherein the first connection port is coupled to the transmitter and to the voltage converter.

26. The container of claim 21, further comprising a third connection port disposed through the one or more walls of the housing and arranged to removably connect the transmitter with the RFID reader.

27. The container of claim 21, further comprising the RFID reader disposed in the interior volume of the housing, the RFID reader electrically coupled to the voltage converter, and wherein the first connection port is arranged to removably couple the one or more antennas with the interior of the housing by removably connecting the RFID reader with the one or more antennas.

28. The container of claim 27, wherein the RFID reader is communicatively coupled to the transmitter.

29. The container of claim 21, further comprising a regulator disposed in the interior volume of the housing and electrically coupled to the voltage converter.

30. The container of claim 29, wherein the second connection port is electrically coupled to the regulator.

31. The container of claim 21, further comprising a magnet coupled to the one or more walls of the housing, the magnet arranged to releasably couple the housing to a movable device.

32. The container of claim 21, wherein the first connection port includes a first type of connector and the second connection port includes a second type of connector that is a different type of connector than the first type of connector.

33. The container of claim 21, wherein one or more of the first and second connection ports includes a locking connector.

34. The container of claim 21, wherein the transmitter is communicatively coupled to a portable communication device externally disposed relative to the housing.

35. The container of claim 21, wherein the voltage converter is configurable to provide a configurable voltage to one or more of the transmitter, the RFID reader, or a sensor for detecting a product.

36. The container of claim 21, wherein the voltage converter is configured to provide a fixed voltage to one or more of the transmitter, the RFID reader, or a sensor for detecting a product.

37. The container of claim 21, further comprising a heat sink disposed in the interior volume of the housing.

38. The container of claim 21, further comprising a fan disposed in the interior volume of the housing.

39. A compact RFID electronics container of an inventory tracking and management system, the container comprising:

a housing including an interior volume and one or more walls at least partially defining the interior volume;

a voltage converter disposed in the interior volume of the housing;

a transmitter disposed in the interior volume of the housing and electrically coupled to the voltage converter to receive a first output voltage of the voltage converter;

a radio frequency identification (RFID) reader disposed in the interior volume of the housing and electrically coupled to the voltage converter to receive a second output voltage of the voltage converter, the second output voltage differing from the first output voltage, and the RFID reader being communicatively coupled to the transmitter;

a sensor connection port disposed through the one or more walls of the housing and arranged to removably communicatively couple the transmitter with a sensor externally disposed relative to the housing; and a second connection port disposed through the one or more walls of the housing and arranged to removably connect the voltage converter with a power source externally disposed relative to the housing;

wherein the transmitter operatively controls the RFID reader in response to receiving information from the sensor.

40. The container of claim 39, further comprising one or more I/O ports disposed through the one or more walls of the housing, the one or more I/O ports arranged to removably couple the RFID reader to one or more corresponding antennas externally disposed relative to the housing.

41. The container of claim 39, wherein the voltage converter is electrically coupled to the sensor connection port and the second connection port.

42. The container of claim 39, further comprising a regulator disposed in the interior volume of the housing and electrically coupled to the voltage converter.

43. The container of claim 42, wherein the second connection port is electrically coupled to the regulator.

44. The container of claim 39, wherein the sensor connection port is coupled to the transmitter and to the voltage converter.

45. The container of claim 39, further comprising a magnet coupled to the one or more walls of the housing, the magnet arranged to releasably couple the housing to a movable device.

46. The container of claim 39, wherein the sensor connection port includes a first type of connector and the second connection port includes a second type of connector that is a different type of connector than the first type of connector.

47. The container of claim 39, wherein one or more of the sensor port and second connection port includes a locking connector.

48. The container of claim 39, wherein the transmitter is communicatively coupled to a portable communication device externally disposed relative to the housing.

49. The container of claim 39, wherein the voltage converter is configurable to provide a configurable voltage to one or more of the transmitter, the RFID reader, or the sensor.

50. The container of claim 39, wherein the voltage converter is configured to provide a fixed voltage to one or more of the transmitter, the RFID reader, or the sensor.

51. The container of claim 39, further comprising a heat sink disposed in the interior volume of the housing.

52. The container of claim 39, further comprising a fan disposed in the interior volume of the housing.

* * * * *